(12) United States Patent
Kim

(10) Patent No.: US 7,411,639 B2
(45) Date of Patent: Aug. 12, 2008

(54) METHOD FOR FABRICATING LIQUID CRYSTAL PANEL USING THERMAL SENSITIVE ADHESIVE

(75) Inventor: Teak Sung Kim, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 476 days.

(21) Appl. No.: 11/094,499

(22) Filed: Mar. 31, 2005

(65) Prior Publication Data

US 2005/0225711 A1    Oct. 13, 2005

(30) Foreign Application Priority Data

Mar. 31, 2004    (KR) .................. 10-2004-0021980

(51) Int. Cl.
*G02F 1/136* (2006.01)
*G02F 1/13* (2006.01)

(52) U.S. Cl. .......................................... 349/45; 349/187
(58) Field of Classification Search ................ 349/187, 349/158, 45; 156/247, 280
See application file for complete search history.

(56) References Cited

U.S. PATENT DOCUMENTS 6,934,001 B2 *    8/2005    Nishiki ...................... 349/187
2006/0275950 A1 *    12/2006    Lee .............................. 438/107

* cited by examiner

*Primary Examiner*—Dung T. Nguyen
(74) *Attorney, Agent, or Firm*—McKenna Long & Aldridge LLP

(57) ABSTRACT

Provided is a method for fabricating a liquid crystal panel, comprising: coating a thermal sensitive adhesive on an outer surface of a plastic substrate; attaching a glass substrate on the thermal sensitive adhesive; performing a liquid crystal cell process on an inner surface of the plastic substrate; and separating the glass substrate from the plastic substrate.

10 Claims, 3 Drawing Sheets

METHOD FOR FABRICATING LIQUID CRYSTAL PANEL USING THERMAL SENSITIVE ADHESIVE

This application claims the benefit of Korean Patent Application No. 2004-21980, filed on Mar. 31, 2004, which is hereby incorporated by reference for all purposes as if fully set forth herein.

BACKGROUND OF THE INVENTION

1. Field of the Invention

The present invention relates to a method for fabricating a liquid crystal panel, and more particularly, to a method for fabricating a liquid crystal panel in which a liquid crystal cell process is performed after a glass substrate is attached on a thin plastic substrate using a thermal sensitive adhesive and then the adhesive and the glass substrate are removed from.

2. Discussion of the Related Art

Liquid crystal displays (LCDs) are being increasingly used as a next generation display device for its a low power consumption, easy portability, its advanced technology and its high added-value.

Among the various types of LCDs, an active matrix LCD having switching elements that can control voltage On/Off of the respective pixels is notable for its high resolution and outstanding display of moving pictures.

In general, an LCD is fabricated by a method including forming an array substrate and a color filter substrate through an array substrate forming process in which a pixel electrode is formed, and a color filter substrate forming process in which a color filter and a common electrode are formed, and performing a liquid crystal cell process in which a liquid crystal material is filled between the array substrate and the color filter substrate.

The driving principle of the LCD is based on the optical anisotropy and polarization of liquid crystal. Because liquid crystal molecules have a thin and long structure, they have a directionality in their molecular arrangement. Their arrangement direction is controllable by artificially applying an electric field to the liquid crystal.

If the arrangement direction of the liquid crystal molecules is artificially controlled, the arrangement of the liquid crystal molecules is changed. Accordingly, when incident light is refracted in the arrangement direction of the liquid crystal molecules by the optical anisotropy, the LCD device is capable of displaying an image.

FIG. 1 is a schematic view illustrating a related art LCD.

Referring to FIG. 1, the LCD 10 includes a lower substrate 14 on which a thin film transistors (TFTs) array is formed, an upper substrate on which color filters are arranged, and a liquid crystal layer 13 interposed between the upper substrate 12 and the lower substrate 14.

The upper substrate 12, the lower substrate 14 and the liquid crystal layer 13 form a liquid crystal panel.

While the upper substrate 12 and the lower substrate 14 have the TFT arrays and the color filters, respectively, they are omitted in FIG. 1.

The LCD further includes a backlight that supplies light for displaying an image.

The TFTs array formed on the lower substrate 14 transmits or controls electrical signals, the liquid crystal layer 13 changes its molecular arrangement depending on an applied voltage, thereby controlling light transmittance. Light controlled through the above processes enables the desired images to be displayed while passing through the upper substrate 12 having the color filters formed thereon.

The LCD is also provided on its both outer surfaces with a lower polarizer 15 and an upper polarizer 11.

Thus, the fabrication of the LCD is completed by a process of forming an upper panel and a lower panel together with a process for forming liquid crystal cells of pixel unit, a process of forming an alignment layer and rubbing the formed alignment layer, a process of attaching the upper panel and the lower panel, and a process of filling liquid crystal between the upper panel and the lower panel attached.

Meanwhile, the glass substrate used as a base substrate of the upper panel and the lower panel is replaced by a plastic substrate because the plastic substrate is thinner and lighter than the glass substrate and thus reduces the risk of fracture.

However, when the aforementioned processes are performed on the thin plastic substrate, a local micro-deformation is caused during an adsorbing process of production due to the thinness and low hardness of the plastic substrate. This results in a micro-failure.

In addition, because the plastic substrate is thin, considerable warping is generated due to its heat-resistance, which results in the lowering of manufacturing productivity while a robot a carrier system transfers the plastic substrates.

Accordingly, when the plastic substrate in the liquid crystal panel is 0.03 mm thick, it is necessary to change the structure of the manufacturing facility and establish a new production line so as to secure the safety with respect to the adsorption, resulting in an enormous additional investment. Also, because the plastic substrate has many local failures, it is problematic because the process yield is low.

SUMMARY OF THE INVENTION

Accordingly, the present invention is directed to a method for fabricating liquid crystal panel using thermal sensitive adhesive that substantially obviates one or more of the problems due to limitations and disadvantages of the related art.

An advantage of the present invention is to provide a method for fabricating a liquid crystal panel in which a liquid crystal cell process is performed after attaching a glass substrate on a thin plastic substrate using a thermal sensitive adhesive, thereby decreasing failures due to a deformation of the thin plastic substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described herein, there is provided a method for fabricating a liquid crystal panel, comprising: coating a thermal sensitive adhesive on an outer surface of a plastic substrate; attaching a glass substrate on the thermal sensitive adhesive; performing a liquid crystal cell process on an inner surface of the plastic substrate; and separating the glass substrate from the plastic substrate.

In another aspect of the present invention, there is provided a method for fabricating a liquid crystal panel that includes coating a thermal sensitive adhesive on a first surface of a first plastic substrate and a first surface of a second plastic substrate; attaching a glass substrate on the thermal sensitive adhesive; forming a TFT array on a second surface of the first plastic substrate and a second surface of the second plastic substrate; attaching the first and second substrates such that the second surface of the first plastic substrate faces the second surface of the second plastic substrate; and separating the thermal sensitive adhesive and the glass substrate attached on the thermal sensitive adhesive from the first and second plastic substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
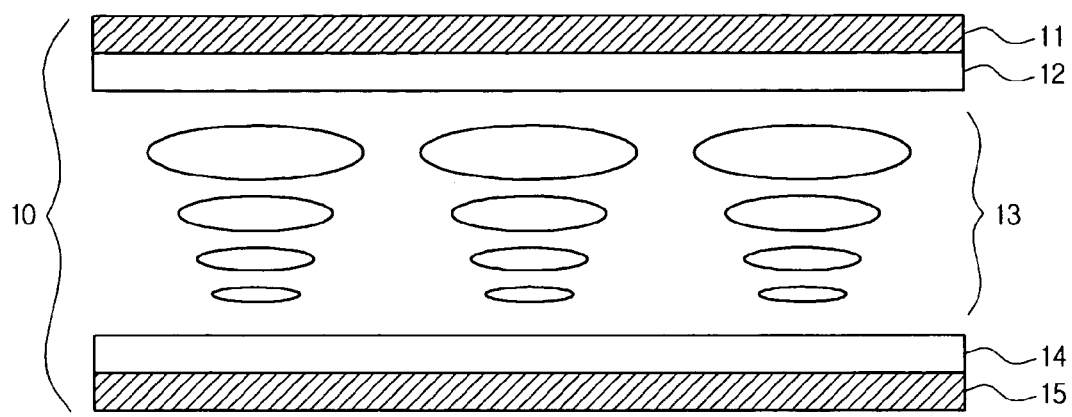
FIG. 1 is a schematic view of a general LCD.
Figure 2A:
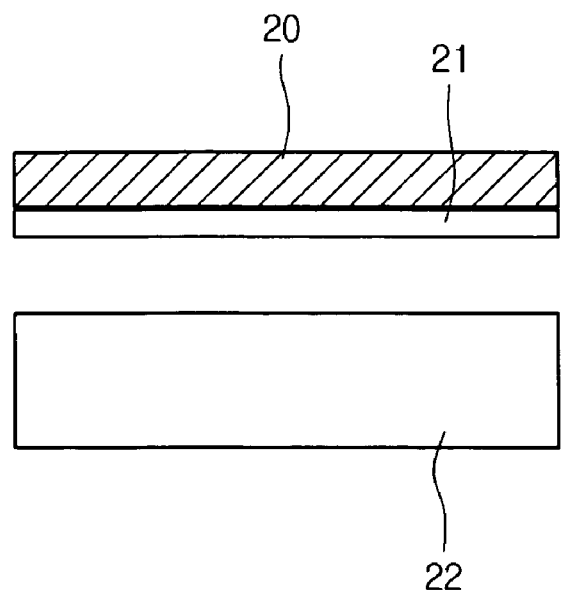
FIGS. 2A through 2C are sectional views illustrating a method for fabricating a liquid crystal panel using a thermal sensitive adhesive according to an embodiment of the present invention.
Figure 2B:
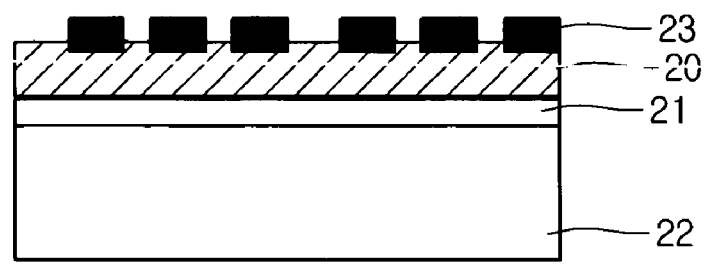
Figure 2C:
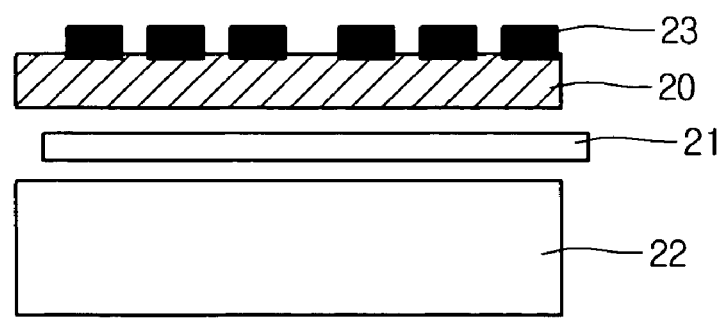

FIGS. 2A through 2C are sectional views illustrating a method for fabricating a liquid crystal panel using a thermal sensitive adhesive according to an embodiment of the present invention.

First, referring to FIG. 2A, a thermal sensitive adhesive 21 is coated on a first surface (i.e., outer surface) of a plastic substrate 20 used as an upper substrate or a lower substrate of a liquid crystal panel.

In more detail, prior to performing a TFT array process or a color filter process on the plastic substrate 20, the plastic substrate 20 and the thermal sensitive adhesive 21 are prepared and the thermal sensitive adhesive 21 is coated on the plastic substrate 20.

When the plastic substrate 20 is used as the upper substrate of the liquid crystal panel, the color filter process is performed on a second surface (i.e., inner surface) of the plastic substrate 20 to form a color filter layer. When the plastic substrate 20 is used as the lower substrate of the liquid crystal panel, the TFT array process is performed on a second surface (i.e., inner surface) of the plastic substrate 20 to form a TFT array.

It is necessary that the plastic substrate 20 and the thermal sensitive adhesive 21 are resistant to any solutions (ex. acid, alkali and water) or heat used in the subsequent liquid crystal cell process.

The thermal sensitive adhesive 21 contains acrylate as its base component, for example, 90% or more hexadecyl acrylate or octadecryl acrylate and a small amount of additives such as methaacrylate (MA) and methyl methaacrylate (MAA) for cross-linking and adhesion.

After the thermal sensitive adhesive 21 is coated on the plastic substrate 20, a glass substrate 22 is attached on the thermal sensitive adhesive 21 as shown in FIG. 2A.

A recipe for attaching the glass substrate 22 on the plastic substrate 20 using the thermal sensitive adhesive 21 is as follows.

In other words, the attaching recipe is set at a room temperature of about 25° C. and a compressive force of approximately 30-1200 g/inch using a roll-press. Bubbles should not permeate between the glass substrate 22 and the thermal sensitive adhesive 21.

Next, referring to FIG. 2B, a liquid crystal cell process is performed on a second surface (i.e., inner surface) of the plastic substrate 20.

As mentioned above, the plastic substrate 20 is used as the upper substrate or the lower substrate of the liquid crystal panel. When the plastic substrate 20 is used as the upper substrate of the liquid crystal panel, the color filter process is performed on a second surface (i.e., inner surface) of the plastic substrate 20 to form a color filter layer. When the plastic substrate 20 is used as the lower substrate of the liquid crystal panel, the TFT array process is performed on a second surface (i.e., inner surface) of the plastic substrate 20 to form a TFT array.

In other words, a reference numeral 23 corresponds to a color filter layer 23 when the plastic substrate 20 is used as the upper substrate, and the reference numeral 23 corresponds to a TFT array when the plastic substrate 20 is used as the lower substrate.

After the color filter layer and the TFT array are respectively formed on the upper substrate and the lower substrate, a general liquid crystal cell process is performed. That is, the upper substrate (i.e., TFT substrate) having the glass substrate 22 and the plastic substrate 20 attached is attached with the lower substrate (i.e., C/F substrate) having the glass substrate 22 and the plastic substrate 20 attached, thereby fabricating the liquid crystal panel.

After the liquid crystal cell process is performed to fabricate the liquid crystal panel having the attached glass substrates 22, a low temperature process is performed to separate the thermal sensitive adhesive 21 and the glass substrate 22 attached on the plastic substrate 20.

In other words, the liquid crystal panel having the glass substrate 22 attached by the thermal sensitive adhesive 21 is loaded into a low temperature chamber having an inner temperature of between about 0 and 10° C. and is kept for about 1 hour. As a result, the glass substrate 22 is separated from the plastic substrate 20 due to the property of the thermal sensitive adhesive 21, thereby completing the liquid crystal panel having the plastic substrate 20 from which the glass substrate 22 and the thermal sensitive adhesive are removed.

That is, when the liquid crystal panel having the attached glass substrate 22 is kept for 1 hour in the low temperature chamber, the adhesive force of the thermal sensitive adhesive 21 is weakened to the utmost so that the thermal sensitive adhesive 21 and the glass substrate 22 can be easily removed.

The thermal sensitive adhesive 21 employed in the present invention maintains its adhesive characteristics above 25° C. but loses the adhesive characteristics below 25° C.

Figure 3:
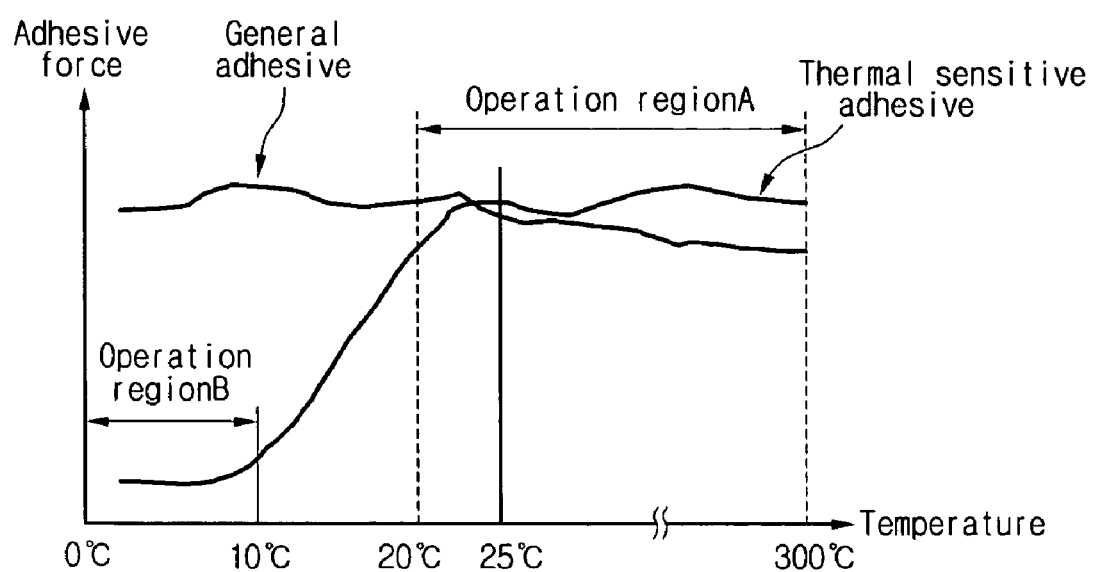
FIG. 3 is a graph showing that the adhesive force of the thermal sensitive adhesive is sharply lower at a temperature below room temperature.

The above fact is clearly illustrated in the graph of FIG. 3 showing that the adhesive force of the thermal sensitive adhesive 21 sharply declines at a temperature below the room temperature.

Referring to FIG. 3, an operating region A is a temperature region of between about 20° C. and 300° C., which corresponds to an operating temperature for a general liquid crystal process, and an operating temperature B is a temperature region below 10° C. lower than the room temperature, which corresponds to a temperature region that permits the separation of the glass substrate 21.

As shown in FIG. 3, a general adhesive shows a constant adhesive force at the operating regions A and B, whereas the thermal sensitive adhesive used in the present invention shows an adhesive force similar to the general adhesive at the operating region A, but shows a very low adhesive force at the operation region B.

From the above result, the temperature for attaching the thermal sensitive adhesive 21 on a rear surface of the plastic substrate 20 is set at approximately 25° C. and the temperature for separating the glass substrate 22 from the plastic substrate 20 is set to be between 0° C. and 10° C.

If the plastic substrate 20 is kept at the temperature range of between 0° C. and 10° C. lower than the temperature for attaching the thermal sensitive adhesive 21, the chemical structure of the thermal sensitive adhesive 21 is changed from a non-solid state to a solid state and the adhesive force of the thermal sensitive adhesive 21 is decreased.

In other words, unlike in the general adhesive, the thermal sensitive adhesive 21 shows that when the operating temperature is set lower than the temperature for attaching the thermal sensitive adhesive 21, the adhesive force is decreased.

The adhesive force of the thermal sensitive adhesive 21 is between about 30 to 45 g/25 mm at a temperature above 25° C., and is between about 5 to 0 g/25 mm at the temperature of between about 0° C. and 110° C., which is the temperature set for separation of the glass substrate.

The thermal sensitive adhesive 21 has a characteristic that its physical property changes in sequence from a non-adhesive liquid state, to a solid state and to a state losing the adhesive force at a temperature lower than 25° C.

Because of this characteristic, as the temperature is reduced to a temperature lower than the attaching operating temperature, the chemical structure of the thermal sensitive adhesive is changed from the non-solid state to the solid state and its adhesive force is decreased, so that the thermal sensitive adhesive can be separated by a small physical force.

Thus, because the present invention performs the liquid crystal cell process after the glass substrate is attached using the thermal sensitive adhesive, it is possible to decrease the failure caused by the deformation of the thin plastic substrate.

As described above, according to the inventive method for fabricating a liquid crystal panel, such as a liquid crystal panel using a very thin plastic substrate, because the liquid crystal cell process is performed after the glass substrate is attached using the thermal sensitive adhesive, it is possible to reduce the failure caused by the deformation of the thin plastic substrate.

In addition, after the liquid crystal cell process is performed, the glass substrate attached using the thermal sensitive adhesive can be easily separated.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal panel, comprising:
    coating a thermal sensitive adhesive on an outer surface of a plastic substrate;
    attaching a glass substrate on the thermal sensitive adhesive;
    performing a liquid crystal cell process on an inner surface of the plastic substrate; and
    separating the glass substrate from the plastic substrate,
    wherein separating the glass substrate is performed at a temperature where the thermal sensitive adhesive loses its adhering ability and is changed into a solid state.

2. The method according to claim 1, wherein the thermal sensitive adhesive is coated at a room temperature where the thermal sensitive adhesive is in a non-solid state.

3. The method according to claim 1, wherein the thermal sensitive adhesive has an acryl resin as a base component thereof.

4. The method according to claim 1, wherein the temperature is set at a range of about 0° C. to 10° C.

5. A method for fabricating a liquid crystal panel, comprising:
    coating a thermal sensitive adhesive on a first surface of a first plastic substrate and a first surface of a second plastic substrate;
    attaching a glass substrate on the thermal sensitive adhesive;
    forming a TFT array on a second surface of the first plastic substrate and a second surface of the second plastic substrate;
    attaching the first and second substrates such that the second surface of the first plastic substrate faces the second surface of the second plastic substrate; and
    separating the thermal sensitive adhesive and the glass substrate attached on the thermal sensitive adhesive from the first and second plastic substrates,
    wherein separating the glass substrate is performed at a temperature where the thermal sensitive adhesive loses its adhering ability and is changed into a solid state.

6. The method according to claim 5, further comprising forming a liquid crystal layer between the second surface of the first plastic substrate and the second surface of the second plastic substrate after the attaching is performed.

7. The method according to claim 5, wherein the thermal sensitive adhesive is coated at a room temperature where the thermal sensitive adhesive is in a non-solid state.

8. The method according to claim 5, wherein the thermal sensitive adhesive has acryl resin as a base component thereof.

9. The method according to claim 8, wherein the thermal sensitive adhesive contains 90% or more hexadecyl acrylate or octadecryl acrylate and additives of MA (methaacrylate) and MAA (methyl methaacrylate).

10. The method according to claim 5, wherein the temperature is set at a range of 0° C. to 10° C.

* * * * *